US010139962B2

(12) United States Patent
Ballan et al.

(10) Patent No.: US 10,139,962 B2
(45) Date of Patent: Nov. 27, 2018

(54) SYSTEM, METHOD AND COMPUTER PROGRAM FOR DETECTING AN OBJECT APPROACHING AND TOUCHING A CAPACITIVE TOUCH DEVICE

(71) Applicant: Advanced Silicon SA, Lausanne (CH)

(72) Inventors: Hussein Ballan, St-Légier (CH); Kevin Fine, Yverdon-les-Bains (CH); Marc Pastre, Ecublens (CH); Julien Schnider, Yverdon-les-Bains (CH); François Vuadens, Blonay (CH)

(73) Assignee: Advanced Silicon SA (CH)

( * ) Notice: Subject to any disclaimer, the term of this patent is extended or adjusted under 35 U.S.C. 154(b) by 0 days.

(21) Appl. No.: 15/582,261

(22) Filed: Apr. 28, 2017

(65) Prior Publication Data

US 2017/0322673 A1  Nov. 9, 2017

(30) Foreign Application Priority Data

May 6, 2016 (EP) .................................... 16168603
Mar. 20, 2017 (EP) .................................... 17161729

(51) Int. Cl.
*G06F 3/044* (2006.01)
*G06F 3/041* (2006.01)
(Continued)

(52) U.S. Cl.
CPC ............ *G06F 3/0418* (2013.01); *G06F 3/042* (2013.01); *G06F 3/044* (2013.01); *G06F 3/0227* (2013.01);
(Continued)

(58) Field of Classification Search
CPC ........ G06F 3/0418; G06F 3/042; G06F 3/044; G06F 3/0227; G06F 3/0362; G06F 2203/04108
See application file for complete search history.

(56) References Cited

U.S. PATENT DOCUMENTS

2007/0003168 A1* 1/2007 Oliver ................. G06F 3/03545
382/314
2008/0018591 A1* 1/2008 Pittel .................... G06F 1/1616
345/156
(Continued)

FOREIGN PATENT DOCUMENTS

CN          105278661 A    1/2016
EP          2365425 A1     9/2011
(Continued)

OTHER PUBLICATIONS

European Search Report for EP Application No. 16168603.5, dated Nov. 7, 2016, 10 pages.

*Primary Examiner* — Shaheda Abdin
(74) *Attorney, Agent, or Firm* — Blank Rome LLP

(57) ABSTRACT

A system (1) detects an object (100) approaching and touching a capacitive touch device (10). The system includes the capacitive touch device (10), a processor, an optical system connected to the processor and arranged to collect information on the object (100). The processor is arranged so as to classify the object (100) as a triggering object or as a non-triggering object based on this information. If the object is classified as a non-triggering object, the processor disables the execution of touch functions of the capacitive touch device (10) at the latest when at least a part of the object (100) touches the capacitive touch device (10). If the object is classified as a triggering object, at the latest when at least a part of the object touches the capacitive touch device (10), the processor executes a predetermined function on the capacitive touch device (10).

16 Claims, 5 Drawing Sheets

(51) Int. Cl.
*G06F 3/042* (2006.01)
*G06F 3/02* (2006.01)
*G06F 3/0362* (2013.01)

(52) U.S. Cl.
CPC .. *G06F 3/0362* (2013.01); *G06F 2203/04101* (2013.01); *G06F 2203/04106* (2013.01); *G06F 2203/04108* (2013.01)

(56) References Cited

U.S. PATENT DOCUMENTS

| | | |
|---|---|---|
| 2008/0158182 A1* | 7/2008 | Westerman ........... G06F 3/0416 345/173 |
| 2008/0238885 A1 | 10/2008 | Zachut et al. |
| 2010/0079403 A1 | 4/2010 | Lynch et al. |
| 2011/0316790 A1 | 12/2011 | Ollila et al. |
| 2012/0120002 A1 | 5/2012 | Ota |
| 2013/0002548 A1 | 1/2013 | Ueno et al. |
| 2013/0100074 A1* | 4/2013 | Chang ................... G06F 3/044 345/174 |
| 2014/0168132 A1 | 6/2014 | Graig et al. |
| 2014/0184551 A1 | 7/2014 | Igarashi et al. |
| 2014/0218337 A1 | 8/2014 | Yamaguchi et al. |
| 2014/0282269 A1 | 9/2014 | Strutt et al. |
| 2014/0340343 A1 | 11/2014 | Han et al. |

FOREIGN PATENT DOCUMENTS

| | | |
|---|---|---|
| EP | 2595033 A1 | 5/2013 |
| EP | 2937765 A2 | 10/2015 |
| WO | WO-2012/034714 A1 | 3/2012 |
| WO | WO-2012/034715 A1 | 3/2012 |
| WO | WO-2013/192454 A2 | 12/2013 |
| WO | WO-2014/174123 A2 | 10/2014 |
| WO | WO-2014/177726 A2 | 11/2014 |
| WO | WO-2014/178021 A1 | 11/2014 |
| WO | WO-2015/057670 A1 | 4/2015 |
| WO | WO-2015/108696 A1 | 7/2015 |

* cited by examiner

SYSTEM, METHOD AND COMPUTER PROGRAM FOR DETECTING AN OBJECT APPROACHING AND TOUCHING A CAPACITIVE TOUCH DEVICE

REFERENCE DATA

The present application claims priority of the European patent application EP20160168603 of May 6, 2016 and of the European patent application EP20170161729 of Mar. 20, 2017. The content of those applications are hereby incorporated by reference.

FIELD OF THE INVENTION

The present invention concerns a system, a method and a computer program for detecting an object approaching and touching a capacitive touch device.

DESCRIPTION OF RELATED ART

Capacitive touch devices are used in various application fields in which object presence detections are involved. Examples of capacitive touch devices comprise, but are not limited to, touch pads, touch panels, touch screens and projective capacitive displays.

Capacitive touch devices comprise in general a touch controller comprising a processor and a detection circuit. The controller is placed in general on a printed circuit board (PCB). Capacitive touch devices comprise also a capacitive sensing medium, generally placed over the PCB. The capacitive sensing medium is in general transparent. In most of the cases, it comprises at least a layer made by ITO (Indium-Tin-Oxyde) or comprising a metal mesh.

Non limitative examples of detection circuits for capacitive touch devices and their relative detection algorithms are described in the documents WO2012034714, WO2012034715, WO2014174123 and WO2014177726 filed by the applicant, the entirety of which are incorporate herein by reference.

Known capacitive touch devices allow to detect an object and determine its position once this object touches the capacitive touch device. Some of those devices allow also to detect a hovering object, in particular a hovering active object, i.e. an object emitting a signal, as an active pen. In this case, hovering and touching events are differentiated from the signals as received by the capacitive touch device, for example by using the strength of the received signal. An example of such a device is described in the document US2008238885. This kind of capacitive touch device does not allow to differentiate hovering and touching events for a passive object, i.e. an object which does not emit any signal, as a passive stylus or a finger.

The document WO15057670 concerns a capacitive touch device having different working modes according to the detected object interacting with the device (e.g. finger, glove or stylus modes). The detection of this object is performed by the capacitive touch device only.

The document WO15108696 concerns a system comprising stereoscopic cameras and a 3D sensing module able to distinguish between touch and hover events on a retroreflector. The described system does not comprise a capacitive touch device.

The document WO14178021 describes a system detecting volumetric features (size, shape) of an object (a finger; a gloved finger; a hand; a gloved hand; a stylus tool; a pen; a pencil; a mechanical stylus; a substantially tubular object; a substantially cylindrical object) up to 5 cm above and/or up to 1 cm outside the (outer) surface of a user interface. Those volumetric characteristics are determined by using capacitive sensors only. Those characteristics cannot be determined if the object does not belong to the rather little volume over and/or around the surface of the user interface.

The document US2014184551 describes a system for differentiating a touch input operation performed through a glove and a hover operation performed with a bare hand for example. The described system does not comprise an optical system.

The document US20140218337 describes a system for differentiating a touch input operation performed through a glove and a hover operation performed with a bare hand for example. Coordinates of an object are acquired to determine a contact state and a proximity state based on a change in an electrostatic capacitance. The proximity state can also be determined by detection of reflected infrared light, detection of reflected ultrasound or image analysis using a camera.

The document EP2595033 discloses an input device with a touch screen. The touch screen comprises a capacitive or resistive contact touch panel and an optical touch panel on the touch screen. If the input device detects a hand with the optical touch panel, it displays a display mode depending on the number of detected fingers. The displayed display mode is confirmed by touching the contact touch panel with a finger.

The document EP2937765 discloses a touch screen with a touch sensor and an optical detector. When the optical detector detects a hand in a second distance from the touch screen, it detects the position of the hand on the screen and starts to detect in the region of the position of the hand on the touch sensor to detect the hand hovering over the touch sensor. If the optical detector senses that the hand enters in a first distance from the touch screen, which is less than the second distance, the touch sensor reduces the size of the touch sensing cells around the position of the hand for detecting a touch of the hand on the touch sensor. The disadvantage of this solution is that the system can only initiate touch action with known objects. Moreover the system seems not arranged for differentiating different kinds or type of objects (e.g. for differentiating a hand from an apple), nor to treat more than one object at the same time. Finally, the described system does not allow to precisely locate the objects in a 3D volume over and/or around the touch screen.

The applicant has been faced to the problem to effectively manage the presence of undesired objects, incidentally approaching and touching a capacitive touch device.

The applicant has also been faced to the problem to perform a detection of an object approaching and touching a capacitive touch device, with a precision of the 3D detection of the object in the space over and/or around the capacitive touch device, which is of the same order of magnitude of the 2D detection precision on the capacitive touch device.

The applicant has also been faced to the problem to perform such a detection in a volume over and/or around the capacitive touch device bigger than the known volumes.

Finally, the applicant has also been faced to the problem to effectively manage the presence of multiple and/or different objects on a capacitive touch device.

It is an aim of the present invention to obviate or mitigate one or more of the aforementioned disadvantages of the prior art.

It is an aim of the present invention to find a solution for the above-mentioned problems.

BRIEF SUMMARY OF THE INVENTION

According to the invention, these aims are achieved by means of a system for detecting an object approaching and touching a capacitive touch device, the system comprising:
a processor,
this capacitive touch device connected to this processor,
an optical system connected to this processor and arranged to collect information on this object.

Although the invention is limited to the use of an optical system for collecting information on the object approaching and touching a capacitive touch device, it must be understood that other systems arranged for collecting information on this object can be used in alternative, e.g. and in a non-limiting way an ultrasonic system as a radar, etc.

In the context of the present invention, the noun "object" indicates an element which can be solid (as a hand or a button), liquid (as a beverage, oil or blood) or jelly like (as a gel). In this context, an object can be active, i.e. arranged to emit a signal, or passive, i.e. unable to emit a signal.

In the context of the present invention, the expression "object near the capacitive touch device" indicates an object at a distance equal or inferior to the 60 cm, for example inferior to the 50 cm, in particular inferior to the 30 cm, from the main surface of the capacitive touch device, i.e. from its capacitive sensing medium. In particular, the distance in this context is considered as calculated from the center of gravity of the object, where the mass of the object is considered as uniformly distributed over its volume.

In a preferred embodiment, the processor of the system according to the invention is configured so as to compute a projection of the object on the capacitive touch device along a predetermined direction, this projection defining a projected touch region on the capacitive touch device.

In one preferred embodiment, this predetermined direction is the direction of the main axis of the object. In this context, the expression "main axis" indicates the axis around which the moment of inertia of the object is minimum, by considering that the mass of the object is uniformly distributed over its volume.

In another embodiment, predetermined direction is the direction of the movement of the object, based on the information collected from the optical system.

In another embodiment, this predetermined direction is the direction perpendicular to the main surface of the capacitive touch device.

In general, the processor of the system according to the invention is configured so as to compute any projection of the object in the referential of the object and/or in the referential of the capacitive touch device. This computing can be performed statistically and/or dynamically.

In a preferred embodiment, the processor of the system according to the invention is arranged to compute the relative positions, speeds and/or accelerations of at least one projected touch region with regard to the effective touch region, i.e. the region of the capacitive touch device physically touched by the object.

In a preferred embodiment, the processor of the system according to the invention is arranged to compute the relative positions, speeds and/or accelerations of the centers of gravity of at least one projected touch region with regard to the center of gravity of the effective touch region.

In the context of the present invention, the expression "center of gravity" designates the geometric center of a (projected or effective) touch region.

In a preferred embodiment, the processor of the system according to the invention is arranged to compute the relative positions, speeds and/or accelerations of the projection of the center of volume of the object on the capacitive touch device along a predetermined direction with regard to the center of gravity of the effective touch region.

In a preferred embodiment, the processor of the system according to the invention is arranged to deduce information on the optical system, on the capacitive touch device and/or on the object based on the above-mentioned computing step(s).

In a preferred embodiment, the deduced information is used for calibrating the optical system and/or the capacitive touch device.

In a preferred embodiment, the information concerning the object and collected by the optical system comprises the shape and/or the size and/or the type and/or the material and/or the color and/or the localization or position of the object. In a preferred embodiment, the localization or position of the object is 3-dimensional.

According to the invention, the processor is arranged so as to classify the object as a triggering object or as a non-triggering object based on the information concerning the object and collected by the optical system.

According to the invention, if the object is classified as a triggering object, at the latest when at least a part of the object touches the capacitive touch device, the processor is arranged so as to execute a predetermined function depending on the information on this object as collected by the optical system. In one preferred embodiment, the processor is arranged so as to execute such a predetermined function when at least a part of the object touches the capacitive touch device.

The predetermined function executed by the capacitive touch device can comprise the displaying of information on the capacitive touch device. In another embodiment, the capacitive touch device can execute different predetermined functions, e.g. a touch function, a menu function, an erase function, a write function, a computer mouse function, etc.

In the context of the present invention, the expression "triggering object" indicates an object for which the user and/or the system according to the invention wishes that the capacitive touch device triggers a function at the latest when at least a part of the object touches the capacitive touch device, depending on the information on this object as collected by the optical system. A triggering object according to this definition is not necessarily an active object.

For example, a triggering object is a bare or gloved open hand and said predetermined function is an activation of a menu For example, a triggering object can be a bare or gloved closed hand or fist, e.g. having a computer mouse shape and said function is a mouse function, i.e. at the latest when at least a part of this hand touches, i.e. enters in direct contact with the capacitive touch device, a computer mouse function is activated. Then, the hand is treated as computer mouse. For example, the capacitive touch device executes a left and/or right click function based on the movement of a finger of this hand as captured by the optical system and/or by the capacitive touch device.

Another example of a triggering object is a rotating button: the executed function depends on the rotation of the rotating button as captured by the optical system and/or by the capacitive touch device. In other words, at the latest when at least a part of this rotating button touches, i.e. enters in direct contact with the capacitive touch device, a function depending on the rotation of the rotating button as captured by the optical system and/or by the capacitive touch device is activated.

Another example of a triggering object is a push button comprising an elastic element, wherein once the push button is pushed, the elastic element is deformed so as to enter into contact with the capacitive touch device, i.e. touch the capacitive touch device, which then executes a push button function.

The triggering object can be also a keyboard or an object comprising at least one of the above-described push buttons.

In one embodiment, the contact between the elastic element and the capacitive touch device is not exploited: in this case, the optical system determines which push button of the keyboard or of the object is pressed and sends this information to the capacitive touch device; then the capacitive touch device can execute a push button function corresponding to the pushed button.

According to the invention, if the object is classified as a non-triggering object, the processor is arranged so as to disable the execution of touch functions of the capacitive touch device at the latest when at least a part of the object touches the capacitive touch device, this disable being performed at least in the zone of contact between the capacitive touch device and the non-triggering object.

In the context of the present invention, the expression "non-triggering object" indicates an object for which the user and/or the system according to the invention wishes that it does not trigger any function when this object touches the capacitive touch device. In other words, the execution of touch functions of the capacitive touch device is disabled at least in the zone of contact between the capacitive touch device and the non-triggering object.

In a variant, the expression "disable the execution of standard touch functions of the capacitive touch device" means to switch the touch functions of the capacitive touch device from an enabled state in a disabled state.

A triggering object according to this definition is not necessarily a passive object. It can be made by an electric conductor material, therefore it could trigger a function when in contact with the capacitive touch device, but this function is undesired. In a preferred embodiment, a non-triggering object is an undesired object that accidentally enters into contact with the capacitive touch device.

Examples of non-triggering objects comprise, but are not limited to, solid objects as a cup of coffee or of beverage in general, a spoon, sugar, etc. In fact, a user working with a capacitive touch device and at the same time drinking a beverage could accidentally place his cup or glass on the capacitive touch device.

Examples of non-triggering objects comprise, but are not limited to, liquids, e.g. liquids that accidentally enter in contact with the capacitive touch device. Those liquids can be of different types, e.g. beverages, industrial or professional liquids as oil, human liquids as blood, medical or surgical liquids as disinfectants or liquids for intravenous feeding, etc.

Examples of non-triggering objects comprise, but are not limited to, jelly like objects as a gel, e.g. a medical gel used during an echography. This gel can accidentally enter into contact with a capacitive touch device of an ultrasound apparatus and some undesired function could be activated due to the contact between the gel and the capacitive touch device.

In one embodiment, the processor of the system classifies all objects detected by the optical system near the capacitive touch device either as triggering object or as non-triggering object, based on the information as collected by the optical system.

In an alternative embodiment, objects that are not classified by the processor (based on the information from the optical system) as triggering objects or as non-triggering objects, are classified by the processor as "unknown objects". In other words, unknown objects are objects that the processor is not able to classify as triggering or non-triggering, based on the information from the optical system. In such a case, the processor classifies those unknown objects based on information concerning the object and collected by the capacitive touch device.

In fact, in this embodiment the capacitive touch device is arranged to collect information on objects while they are approaching (hovering) and/or touching it.

In one preferred embodiment, the information concerning the object and collected by the capacitive touch device comprises the shape and/or the size and/or the localization or position of the object.

In an alternative embodiment, in order to classify an unknown object, the processor uses also information on this object as previously collected by the optical system, in combination with information as collected by the capacitive touch device.

If the processor classifies an unknown object as a triggering object based on the information from the capacitive touch device, it is arranged so as to execute a predetermined function depending on this information collected by the capacitive touch device. In one embodiment, information previously collected by the optical system can be used in combination with information collected by the capacitive touch device.

If the processor classifies an unknown object as a non-triggering object based on the information from the capacitive touch device, it is arranged so as to disable the execution of touch functions of the capacitive touch device, this disable being performed at least in the zone of contact between the capacitive touch device and the non-triggering object.

In an alternative embodiment, objects that are not classified by the processor based on the information from the capacitive touch device as triggering objects or as non-triggering objects, are classified by the processor once again as "unknown objects". In other words, those objects are "unknown objects" for the processor, based on information either from the optical system and from the capacitive touch device.

In such a case, according to one embodiment, the processor of the system according to the invention is arranged so as to disable the execution of touch functions of the capacitive touch device, this disable being performed at least in the zone of contact between the capacitive touch device and the unknown object (as for a non-triggering object).

According to an alternative embodiment, if an object is classified as "unknown object" by the processor based on the information from the capacitive touch device, after having been classified as "unknown object" by the processor based on the information from the optical system, the processor of the system according to the invention is arranged so as to execute a predetermined function, e.g. a computer mouse click function.

Both for triggering and non-triggering objects, and possibly for unknown objects as well, the system according to the invention effectively exploits the interaction between the capacitive touch device and the optical system: in fact, the information on the object collected by the optical system is used for classifying the object itself. This classification allows the capacitive touch device—at the latest when at least a part of the object touches the capacitive touch device—to disable the execution of touch functions of the capacitive touch device (if the object is classified as a non-triggering object), or to execute a predetermined function depending on the information on this object (if the object is classified as a triggering object).

In one embodiment, the system has already some pre-programmed criteria for classifying an object as a triggering or non-triggering object (e.g. a spoon can be by default set as a non-triggering object). In another embodiment, the user directly inputs in the system new criteria and/or has the possibility to modify the existing ones (the same object that has been treated as a non-triggering object could in the future be classified as a triggering object and vice-versa). In still another embodiment, the system is connected to a database comprising updated criteria and can download them. In another embodiment, the system is connected to other similar systems with which it can exchange those criteria.

In one embodiment, the system executes the predetermined function depending on the information on this object classified as triggering object only, if the capacitive touch device detects that at least a part of the object touches the capacitive touch device. In all the cases, the system according to the invention is flexible and can be adapted to very different situations and environment.

Moreover, it can effectively manage the presence of non-triggering object.

It can also effectively manage the presence of multiple and/or different (triggering and/or non-triggering) objects.

Thanks to the presence of the optical system, which can allow very precise localization, the system according to the invention can perform a 3D objects' detection, with a 3D detection precision in the space over and/or around the capacitive touch device, which is of the same order of magnitude of the 2D detection precision on the capacitive touch device. For example, each side of a cubic voxel in the space over and/or around the capacitive touch device has a length inferior to 1 cm, for example inferior to 6 mm, e.g. 4 mm, and each side of a squared pixel of the capacitive touch device has a length inferior to 1 cm, for example inferior to 6 mm, e.g. 4 mm.

Moreover, this detection can be performed in a volume over and/or around the capacitive touch device bigger than the known volumes, as the optical system of the invention allows to detect and collect information on an object at a distance up to 60 cm from the capacitive touch device.

In a preferred embodiment, the processor according to the invention belongs to the capacitive touch device. In another embodiment, the processor according to the invention belongs to the optical system. In another embodiment, it is an external processor, independent from but connected to the capacitive touch device and/or to the optical system.

In still another embodiment, the system according to the invention comprises two processors, one in the capacitive touch device and the other in the optical system, each of those processors being arranged so as to execute at least some of the functions according to the invention, the two processors being arranged so as to work in a cooperative and effective way in order to perform together all the functions according to the invention.

For example, the processor of the optical system can classify the object as a triggering object or as a non-triggering and transmit this information to the processor of the capacitive touch device. Then, the processor of the capacitive touch device can—at the latest when at least a part of the object touches the capacitive touch device—disable the execution of touch functions of the capacitive touch device (if the object is classified as a non-triggering object), or execute a predetermined function depending on the information on this object (if the object is classified as a triggering object).

In still another embodiment, the system according to the invention comprises three processors, one in the capacitive touch device one in the optical system, and one external, each of those processors being arranged so as to execute at least some of the functions according to the invention, the three processors being arranged so as to work in a cooperative and effective way in order to perform together all the functions according to the invention.

In one embodiment, the capacitive touch device comprises a zone having a thickness higher than 1 cm. In particular, it comprises a capacitive sensing medium having a zone of thickness higher than 1 cm. In this embodiment, the touch function in this zone is executed based on the information from the optical system only.

In one embodiment, the optical system comprises at least one optical imaging device, i.e. a device forming imaging.

In one embodiment, the optical system comprises at least one stereoscopic camera. In this context, the expression "stereoscopic camera" indicates a camera comprising at least two sensors displaced with respect to each other so that they view substantially the same scene and allow a stereoscopic view. More sensors may provide a more complete and accurate stereoscopic view, for example the stereoscopic camera may comprise three sensors in three corners of the capacitive touch device, or may comprise multiple stereo pairs, for example one in each of the four corners of the capacitive touch device, for a total for eight sensors.

Many combinations of sensors and placements of those sensors are possible. In a particular embodiment, triangulation is used to deduce three-dimensional structures from multiple two-dimensional sensor images.

In a preferred embodiment, the capacitive touch device is square or rectangular and comprises a side at least 1 meter long.

The present invention also concerns a method for detecting an object approaching and touching a capacitive touch device of a detection system, this detection system also comprising:
  a processor, and
  an optical system connected to this processor and arranged to collect information on this object,
the method comprising the following steps:
  classify the object as a triggering object or as a non-triggering object based on this information from this optical system,
  if the object is classified as a non-triggering object, disable the execution of touch functions of the capacitive touch device at the latest when at least a part of the object touches the capacitive touch device, the disable being performed at least in the zone of contact between the capacitive touch device and the non-triggering object,
  if the object is classified as a triggering object, at the latest when at least a part of the object touches the capacitive touch device, execute a predetermined function on this capacitive touch device depending on this information.

According to one embodiment, this method comprises also the following steps:
  classify an object as unknown object, if it is not classified as triggering nor as non-triggering based on the information from the optical system;

classify the unknown object as a triggering object or as a non-triggering object based on information from the capacitive touch device, if the object is classified as a non-triggering object, disable the execution of touch functions of the capacitive touch device, the disable being performed at least in the zone of contact between the capacitive touch device and the non-triggering object, if the object is classified as a triggering object, execute a predetermined function on this capacitive touch device depending on this information.

According to one embodiment, this method comprises also the following steps:

classify an unknown object once again as unknown object, based on the information from the capacitive touch device, if it is not classified by the processor as triggering nor as non-triggering based on the information from the capacitive touch device, disable the execution of touch functions of the capacitive touch device, the disable being performed at least in the zone of contact between the capacitive touch device and the unknown object, or in alternative to this disable step execute a predetermined function on this capacitive touch device, e.g. a click function.

The present invention also concerns a computer program product for detecting an object approaching and touching a capacitive touch device of a detection system, this detection system also comprising:

a processor, and an optical system connected to this processor and arranged to collect information on this object, this computer program product comprising:

a tangible computer usable medium including computer usable program code being used for classifying the object as a triggering object or as a non-triggering object based on this information from this optical system, if the object is classified as a non-triggering object, disable the execution of touch functions of the capacitive touch device at the latest when at least a part of the object touches the capacitive touch device, this disable being performed at least in the zone of contact between the capacitive touch device and the non-triggering object, if the object is classified as a triggering object, at the latest when at least a part of the object touches the capacitive touch device, execute a predetermined function on this capacitive touch device depending on this information.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
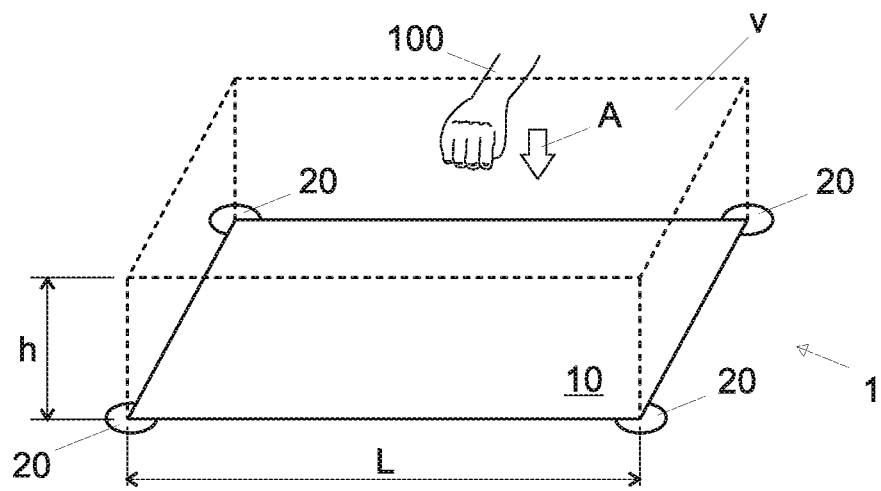
FIG. 1 shows a perspective view of the system according to one embodiment of the invention, and of a triggering object.

FIG. 1 shows a view of a perspective view of the system 1 according to one embodiment of the invention and of an object 100. In particular, the system 1 is arranged for detecting the object 100, in this case a closed hand, approaching and touching a capacitive touch device 10. The approaching of the object 100 towards the capacitive touch device 10 is indicated in FIG. 1 by the direction of the arrow A. The capacitive touch device 10 comprises a capacitive touch sensor surface. When a contact of an object and the capacitive touch device 10 is described in the following, it is preferably the contact between the capacitive touch sensor surface and the object. The capacitive touch device 10 is preferably a capacitive touch screen, i.e. the capacitive touch sensor surface is configured to display information.

The system 1 according to the invention comprises:

a processor (not illustrated), the capacitive touch device 10, which is connected to this processor, an optical system connected to this processor.

In the illustrated example, the capacitive touch device 10 has a rectangular shape and the optical system comprises four elements 20, e.g. four cameras, each camera being placed at a corner of the capacitive touch device 10. In one preferred embodiment, a size of the capacitive touch device 10 has a length l equal or higher than 1 m.

According to the invention, the optical system is arranged to collect information on the object 100, which is near the capacitive touch device 10 and which is approaching the capacitive touch device 10.

Although in the example of FIG. 1 the object 100 is a solid, the present invention is not limited to this embodiment. In fact, this object can be liquid (as a beverage, oil or blood) or jelly like (as a gel).

Although in the example of FIG. 1 the object 100 is passive, i.e. unable to emit a signal, the present invention is not limited to this embodiment. In fact, the object can be active, i.e. arranged to emit a signal.

The optical system is arranged so as to collect information on the object 100 at a distance h equal or inferior to the 60 cm, for example inferior to the 50 cm, in particular inferior to the 30 cm, from the main surface of the capacitive touch device 10, i.e. from its capacitive sensing medium.

In a preferred embodiment, the information concerning the object and collected by the optical system comprises the shape and/or the size and/or the type and/or the material and/or the color and/or the localization or position of the object. In a preferred embodiment, the localization or position of the object is 3-dimensional, because effectuated at least in the volume V over the capacitive touch device 10.

In this case, the optical system recognizes that the moving object 100 is a hand, in particular a closed hand. Moreover, the optical system determines and tracks its position in the space V over the capacitive touch device 10.

According to the invention, the processor is arranged so as to classify the object 100 as a triggering object or as a non-triggering object based on the information concerning the object and collected by the optical system.

If the object 100 detected by the optical system is classified as a triggering object, preferably a predetermined function associated with the triggering object is executed on the capacitive touch device. Examples for triggering objects are described below.

If the object 100 detected by the optical system is classified as a non-triggering object, the execution of the standard touch function of the capacitive touch device 10 is disabled. Preferably, the standard touch function is disabled at the latest when at least a part of the object 100 touches the capacitive touch device 10 in a disablement zone of the capacitive touch sensor surface.

The disablement zone corresponds preferably at least to the zone of contact 12 between the capacitive touch device 10 and the non-triggering object, preferably to the zone of contact 12 plus a security region around the zone of direct contact 12. This security region could be a fix width surrounding the zone of contact 12.

Alternatively, the width could vary around the zone of contact 12. The fixed or varying width of the security region could depend on the type non-triggering object (e.g. liquid or solid), on the velocity of the object, the direction of movement of the object and/or the type of functions activated by a touch function around the zone of contact 12.

Preferably, the execution of the standard touch function of the capacitive touch device 10 and/or other predetermined functions are maintained enabled in another zone of the capacitive touch device 10, preferably the remaining zone of the capacitive touch sensor surface, for (at least a part of) the time during which the touch functions of the capacitive touch device 10 remains disabled in the disablement zone. The zone of contact 12 could be computed as the projection touch region described below.

To disable the execution of standard touch function of the capacitive touch device 10 means to switch the touch functions of the capacitive touch device 10 from an enabled state in a disabled state. This could be realized by switching off the detection of a touch in the disablement zone by the capacitive touch device 10 or simply by not activating the touch function, if the detection of a touch in the disablement zone is captured by the capacitive touch device 10. Examples of non-triggering objects are given below.

Preferably, the system 1 is able to treat multiple objects at the same time. The multiple objects could be of different or distinct classification. In particular, the processor of system 1 can be arranged to treat multiple objects at the same time. In one preferred embodiment, the processor of system 1 is arranged to treat at the same time at least one triggering object and at least one non-triggering object. For example, two persons could work on the capacitive touch device with their hands, while a bit of coffee drops on the capacitive touch device 10. Then, the two persons can continue to work normally, while the standard touch function is disabled at least in the zone of contact with the coffee droplet.

For example, the closed hand 100 as a triggered object could be treated as computer mouse. For example, the capacitive touch device executes a left and/or right click function based on the movement of a finger of this hand 100 as captured by the optical system and/or by the capacitive touch device 10.

Moreover, as the optical system has determined and tracked the position of the object 100 in the space over the capacitive touch device 10, the processor can—on the basis of this information—deduce in advance the position at which the closed hand will enter into contact with the capacitive touch device 10 and then prepare itself in advance to activate the standard touch function or another associated predetermined function in correspondence of this predicted position. This increases the speed of the reaction time of the system.

In another example, the approaching object is an open hand (not illustrated), the optical system recognizes that the hand is open and the processor, based on this information, can activate a menu as predetermined function associated with the open hand. This menu can be displayed on the capacitive touch device 10 before that the hand touches it. The displayed menu can then be selected by touching it by a finger of this hand.

If the approaching object is a hand with a pointing finger, e.g. a pointing index (not illustrated), the optical system recognizes this particular shape of the hand. The processor, based on this information, can pre-select or select a point or zone of the capacitive touch device 10, in correspondence of the position at which the pointing finger is supposed to enter into contact with the capacitive touch device 10, according to tracking information of this hand performed by the optical system.

In the illustrated example, each element 20 of the optical system has been represented in a schematic way. In one embodiment, each element 20 comprises at least a stereoscopic camera over capacitive touch device 10.

In another embodiment, each element 20 comprises at least a stereoscopic camera under the capacitive touch device 10 and a mirror, in particular a concave mirror, cooperating with the camera so as to send it the light.

In another embodiment, each element 20 of the optical system comprises a couple of stereoscopic cameras.

In another embodiment, each element 20 of the optical system comprises a stereoscopic camera and a couple of mirrors.

In another embodiment, one or more elements 20 of the optical system are infrared cameras, and may include sources of infrared light to aid in the 3D localization of the object 100.

In all the cases, the number and/or the type of cameras is arranged so that the optical system has a stereoscopic view of the surrounding environment and can determine the 3D localization of an object.

Figure 2:
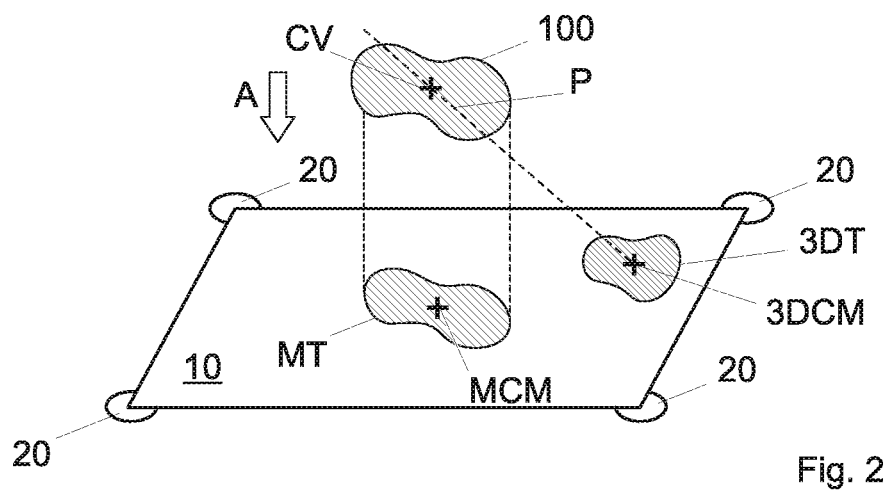
FIG. 2 shows another perspective view of the system according to one embodiment of the invention, and of a schematic triggering object.

As illustrated in FIG. 2, each object 100 approaching the capacitive touch system has a center of volume CV, which can be computed by the processor of the system according to the invention based on the information from the optical system.

The object 100 is also characterized by a main axis P. In this context, the expression "main axis" indicates the axis around which the moment of inertia of the object 100 is minimum, by considering that the mass of the object 100 is uniformly distributed over its volume. The main axis P of the object can be computed as well by the processor of the system according to the invention based on the information from the optical system.

In one preferred embodiment, the processor of the system according to the invention is configured so as to compute the projection of the object 100 on the capacitive touch device 10 along a predetermined direction. In a particular embodiment, this direction is the direction of the main axis P. In other words, at least some points belonging to the object 100 are projected on the capacitive touch device 10 by using the direction of the main axis P based on the information from the optical system. This projection defines the projected touch region 3DT illustrated on FIG. 2.

However, it must be noted that in general, the processor of the system according to the invention is configured so as to compute any projection of the object 100 in the referential of the object 100 and/or in the referential of the capacitive touch device 10. This computing can be performed statistically and/or dynamically.

In a particular embodiment, this projection is computed by the processor of the system according to the invention before that the object 100 enters into contact with the capacitive touch device 10. In particular, this processor is arranged so as to compute the shape of the projected touch region 3DT and its center of gravity 3DCM.

In the context of the present invention, the expression "center of gravity" designates the geometric center of a (projected or not) touch region.

In one preferred embodiment, the processor of the system is configured also so as to compute the projection of the object 100 on the capacitive touch device 10 along the direction of the movement of the object 100 approaching the capacitive touch device 100, this direction being indicated by the arrow A on FIG. 2. This projection defines the projected touch region MT illustrated on FIG. 2.

The direction of the movement of the object 100 in fact does not necessarily correspond to the direction of its main axis P.

This projection is computed by the processor of the system according to the invention before that the object 100 enters into contact with the capacitive touch device 10. In particular, the processor is arranged so as to compute the shape of the projected touch region MT and its center of gravity MCM. Accordingly, before that the object 100 touches the capacitive touch device 10, the shape and/or the center of gravity of the part of the object 100 which is supposed to enter into contact with the capacitive touch device 10 are known.

Once the object 100 touches, i.e. enters into contact with the capacitive touch device 10, the processor of the system according to the invention can compute the shape and/or the center of gravity CM of the effective touch region T (i.e. the region of the capacitive touch device 10 physically touched by the object 100).

It must be noted that the shape and/or the center of gravity CM of the effective touch region T can be different from the shape and/or the center of gravity of the supposed or projected touch regions 3DT and/or MT.

In another preferred embodiment, the processor of the system is configured also so as to compute the projection of the object 100 on the capacitive touch device 10 along the direction perpendicular to the capacitive touch device 100. In the embodiment of FIG. 2, this direction corresponds to the direction of the movement of the object, indicated by the arrow A. However, it must be understood that FIG. 2 illustrates a particular embodiment and that in general the direction perpendicular to the capacitive touch device 100 does not necessarily correspond to the direction of the movement of the object 100.

Figure 3:
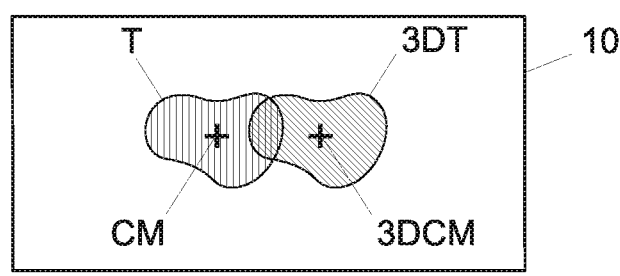
FIG. 3 shows a top view of the capacitive touch device of the system according to one embodiment of the invention.

FIG. 3 shows a top view of the capacitive touch device 10 of the system according to the invention, comprising the projected touch region 3DT, computed by projecting the object 100 on the capacitive touch device 10 along its main axis P, and the effective touch region T, i.e. the region of contact between the object 100 and the capacitive touch device 10. In this example, the shape and the center of gravity CM of the projected touch region 3DT are different from shape and the center of gravity CM of the effective touch region T.

According to a preferred embodiment of the invention, the processor of the system is arranged so as to compute the relative positions, speeds and/or accelerations of the projected touch regions 3DT and/or MT with regard to the effective touch region T.

According to another preferred embodiment of the invention, the processor of the system is arranged so as to compute the relative positions, speeds and/or accelerations of the centers of gravity 3DCM, MCM of the projected touch region 3DT respectively MT with regard to the center of gravity CM of the effective touch region T.

According to another preferred embodiment of the invention, the processor of the system according to the invention is arranged so as to compute the relative positions, speeds and/or accelerations of the projection of the center of volume CV on the capacitive touch device 10 along the movement direction and/or along the direction of the main axis P, with regard to the center of gravity CM of the effective touch region T.

According to another preferred embodiment, the processor of the system is arranged so as to deduce information on the optical system, on the capacitive touch device and/or on the object 100 based on the above-mentioned computing steps.

For example, if the movement speed of the supposed touch region 3DT is higher or lower than the movement speed of the effective touch region T, it is possible to deduce that the optical system is not coordinated with the capacitive touch device 10.

In a preferred embodiment, the deduced information can be used for calibrating the optical system and/or the capacitive touch device 10.

In another embodiment, the deduced information can be used for computing or re-computing a feature or parameter of the object 100, e.g. its shape or position.

Another embodiment of a triggering object could be a mechanical user input device. Such a mechanical user input device could be a push button, a keyboard, rotating knob, a trackball, a joystick, etc. Preferably, the predetermined function associated with the detected mechanical user input device is executed, when the activation of the mechanical user input device is detected on the capacitive touch device 10 and/or by the optical system.

Preferably, the execution of the associated function requires in addition, that the mechanical user input device is in contact with the touch device 10. Preferably, the user input device comprises a support surface (including also the case of multiple point support). In one embodiment, if the support surface is not in contact with the capacitive touch device 10 or is not detected on the capacitive touch device 10, the associated predetermined function is not executed, even if the activation of the user input device is detected.

Preferably, the mechanical user input device comprises an activation element which is movable relative to the support surface (not shown). The predetermined function is executed, when the active element is moved relative to the support surface (detected by the capacitive touch device 10 and/or the optical system), when the active element comes into contact with the capacitive touch device 10 and/or if the support surface is in contact with the capacitive touch device 10. In one embodiment, the mechanical input device comprises a capacitively detectable material, preferably in the activation element such that the movement or the contact of the active element is detectable on the capacitive touch device. Preferably, the active element comprises a conductive material connecting the region touched by a user with the surface coming into contact or in close vicinity with the capacitive touch device 10.

Figure 4:
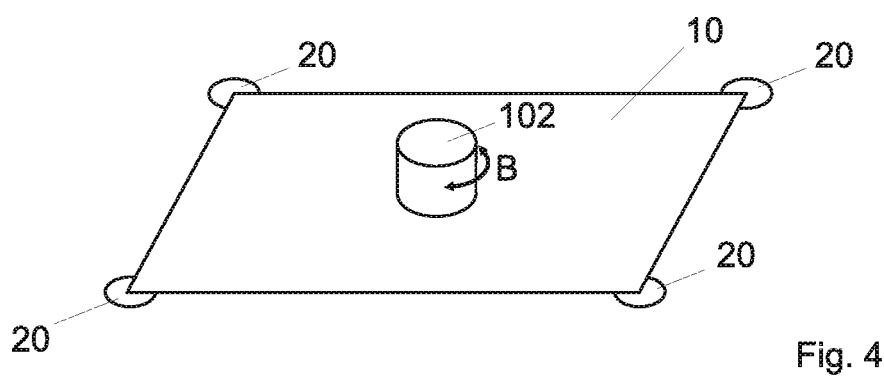
FIG. 4 shows a perspective view of the system according to another embodiment of the invention, and of another triggering object.

FIG. 4 shows a view of a perspective view of the system 1 according to another embodiment of the invention, and of another object, in this case a rotating button 102.

In this case, the optical system recognizes that the moving object is a rotating button 102, e.g. from its shape and size. Moreover, the optical system determines and tracks its position in the space over the capacitive touch device 10.

According to the invention, the processor is arranged so as to classify the object 102 as a triggering object or as a non-triggering object based on the information concerning the object and collected by the optical system.

In this case, since the moving object is a rotating button 102, the processor of the detection system according to the invention classifies it as a triggering object.

As the object 102 (the rotating button) is classified as a triggering object, at the latest when at least a part of the rotating button 102 touches the capacitive touch device 10, the processor is arranged so as to execute a function which depends on the rotation of the rotating button 102 (indicated by the arrow B in FIG. 4), as captured by the optical system and/or by the capacitive touch device. In other words, at the latest when at least a part of this rotating button 102 touches, i.e. enters in direct contact with the capacitive touch device 10, a function depending on the rotation of the rotating button 102 as captured by the optical system and/or by the capacitive touch device 10 is activated.

Figure 5:
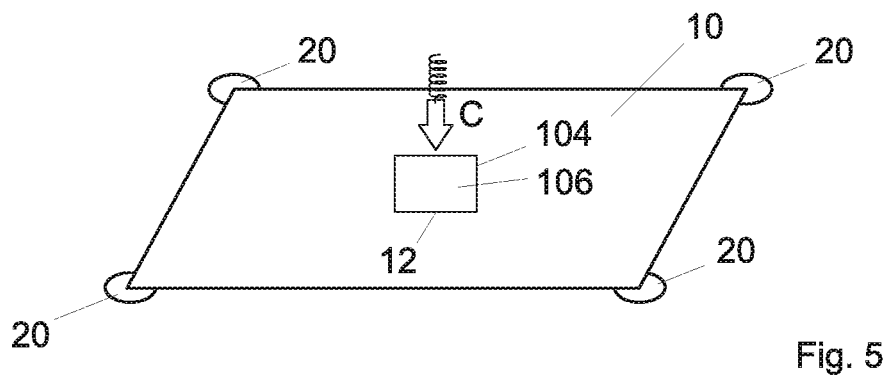
FIG. 5 shows a perspective view of the system according to another embodiment of the invention, and of another triggering object.

FIG. 5 shows a view of a perspective view of the system 1 according to another embodiment of the invention, and of another object, in this case a push button 104.

In this case, the optical system recognizes that the moving object is a push button 104, e.g. from its shape and size. Moreover, the optical system determines and tracks its position in the space over the capacitive touch device 10.

According to the invention, the processor is arranged so as to classify the object 104 as a triggering object or as a non-triggering object based on the information concerning the object and collected by the optical system.

In this case, since the moving object is a push button 104, the processor of the detection system according to the invention classifies it as a triggering object.

As the object 104 (the push button) is classified as a triggering object, at the latest when at least a part of the rotating button 104 touches the capacitive touch device 10, the processor is arranged so as to execute a push button function.

In the illustrated example, the push button 104 comprises an elastic element 106, e.g. a spring. Once the push button 104 is pushed, as indicated by the arrow C in FIG. 5, the elastic element 106 can enter into contact with the capacitive touch device 10 in correspondence of a point or zone 12: this contact allows the capacitive touch device 10 to execute a push button function.

In another embodiment, not illustrated, the capacitive sensing medium 16 can have a hole or opening in correspondence of the point or zone 12 of the contact between the elastic element 106 and the capacitive touch device 10, so as to allow the elastic element 106 to directly enter into contact with the capacitive touch circuit or controller under the capacitive sensing medium 16, so as to execute a touch function. This embodiment is particularly advantageous if the thickness of the capacitive sensing medium 16 is so important, e.g. higher that 5 mm, such that a touch detection would be not possible.

The triggering object can be also a keyboard (not illustrated) or any other object, e.g. dummy object, comprising at least one of the above-described push buttons 104.

In one embodiment, the contact between the elastic element 106 and the capacitive touch device 10 is not exploited: in this case, the optical system determines which push button 104 of the keyboard is pressed and sends to the capacitive touch device 10 this information such that the capacitive touch device 10 can execute a push button function corresponding to the pushed button at a zone corresponding to the position of this push button on the capacitive touch device 10.

Figure 6:
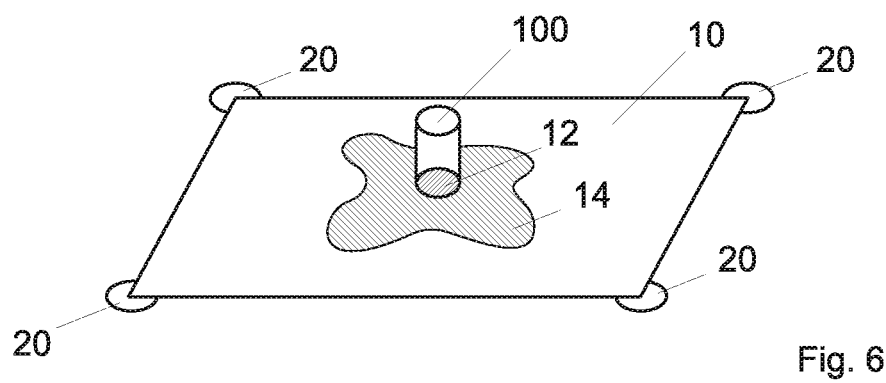
FIG. 6 shows a perspective view of the system according to another embodiment of the invention, and of an object.

FIG. 6 shows a view of a perspective view of the system 1 according to another embodiment of the invention, and of an object 100, in this case a joystick or an element used in the aero-spatial domain.

In this case, the processor of the detection system according to the invention classifies it as a triggering object. As the object 100 is classified as a triggering object, at the latest when at least a part of the object 100 touches the capacitive touch device 10, the processor is arranged so as to display a zone 14 around the contact zone 12 between object and the capacitive touch device 10, this zone 14 allowing the user to efficiently use the object.

In one embodiment, the object 100 is a joystick or a rotating button and the zone 14 displayed around the contact zone 12 between object and the capacitive touch device 10 comprises graduation signs.

In another embodiment, the object 100 is an open hand: before the contact between this open hand and the capacitive touch device 10, a zone 14 is displayed on the capacitive touch device 10. In one preferred embodiment, this zone 14 comprises a menu. The user can then select functions in this menu by touching it with the fingers of the open hand recognized by the optical system.

According to the invention, if the object is classified as a non-triggering object, the processor is arranged so as to disable the execution of touch functions of the capacitive touch device 10 at the latest when at least a part of the object touches the capacitive touch device, this disable being performed at least in the zone of contact between the capacitive touch device and the non-triggering object.

With the reference of FIG. 6, if the object 100 is classified as a non-triggering object, the execution of touch functions of the capacitive touch device 10 is disabled at least in the zone 12 of contact between the capacitive touch device 10 and the non-triggering object 100. In this example, it can be disabled also in a zone 14 around the contact zone 12.

A triggering object according to this definition is not necessarily a passive object. It can be made by an electric conductor material, therefore it could trigger a function when in contact with the capacitive touch device 10, but this function is undesired. In a preferred embodiment, a non-triggering object is an undesired object that accidentally enters into contact with the capacitive touch device 10.

Examples of non-triggering objects comprise, but are not limited to, solid objects as a cup of coffee or of beverage in general, a spoon, sugar, etc. In fact, a user working with a capacitive touch device 10 and at the same time drinking a beverage could accidentally place his cup or glass on the capacitive touch device 10.

Examples of non-triggering objects comprise, but are not limited to, liquids, e.g. liquids that accidentally enter in contact with the capacitive touch device. Those liquids can be of different types, e.g. beverages, industrial or professional liquids as oil, human liquids as blood, medical or surgical liquids as disinfectants or liquids for intravenous feeding, etc.

Examples of non-triggering objects comprise, but are not limited to, jelly like objects as a gel, e.g. a medical gel used during an echography. This gel can accidentally enters into contact with a capacitive touch device 10 of an ultrasound apparatus and some undesired function could be activated due to the contact between the gel and the capacitive touch device 10.

Such liquids or jelly like objects could for example be detected by detecting in the optical system a change of the form of the object over time or by detecting a typical form or other characteristics of a moving liquid (like a droplet-form) or a jelly-like objects.

In one preferred embodiment, the optical system and/or the capacitive touch device 10 track the movement of the non-triggering object on the capacitive touch device 10, so as to dynamically disable the execution of touch functions of the capacitive touch device in the zone of contact between the capacitive touch device 10 and the non-triggering object.

For example, if the non-triggering object is a medical gel used during an echography, once this gel enters accidentally into contact with a capacitive touch device 10 of an ultrasound apparatus, it can also move on this apparatus, and some undesired function could be activated due to the contact between the gel and the capacitive touch device 10. Advantageously, the movement of the gel on the capacitive touch device 10 can be tracked so as to dynamically disable the execution of touch functions of the capacitive touch device 10 in the zones of contact with the gel.

In one embodiment, the system according to the invention has already some pre-programmed criteria for classifying an object as a triggering or non-triggering object (e.g. a spoon can be by default set as a non-triggering object). In another embodiment, the user directly inputs in the system new criteria and/or has the possibility to modify the existing ones. In still another embodiment, the system is connected to a database comprising updated criteria and can download them. In another embodiment, the system is connected to other similar systems with which it can exchange those criteria.

In all the cases, the system according to the invention is flexible and can be adapted to various situations and environment.

Moreover, it can effectively manage the presence of non-triggering objects.

In a preferred embodiment, the processor according to the invention belongs to the capacitive touch device 10. In another embodiment, the processor according to the invention belongs to the optical system. In another embodiment, it is an external processor, independent from but connected to the capacitive touch device 10 and/or to the optical system.

In still another embodiment, the system according to the invention comprises two processors, one in the capacitive touch device 10 and the other in the optical system, each of those processors being arranged so as to execute at least some of the functions according to the invention, the two processors being arranged so as to work in a cooperative and effective way in order to perform together all the functions according to the invention.

For example, the processor of the optical system can classify the object as a triggering object or as a non-triggering and transmit this information to the processor of the capacitive touch device 10. Then, the processor of the capacitive touch device 10 can disable the execution of touch functions of the capacitive touch device 10 at the latest when at least a part of the object touches the capacitive touch device 10 (if the object is classified as a non-triggering object), or execute a predetermined function depending on the information on this object (if the object is classified as a triggering object).

In still another embodiment, the system according to the invention comprises three processors, one in the capacitive touch device 10, one in the optical system, and one external, each of those processors being arranged so as to execute at least some of the functions according to the invention, the three processors being arranged so as to work in a cooperative and effective way in order to perform together all the functions according to the invention.

Figure 7:
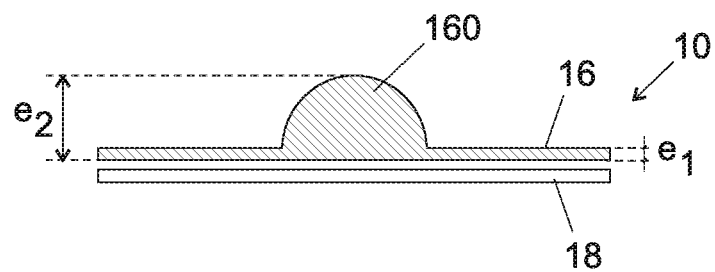
FIG. 7 shows a cut view of the capacitive touch device of the system according to an embodiment of the invention.

FIG. 7 shows a view of a cut view of the capacitive touch device 10 of the system according to an embodiment of the invention. In this case, the capacitive touch device 10 comprises a zone 160 having a thickness e2 higher than 1 cm. In particular, it comprises a capacitive sensing medium 16 having a zone 160 of thickness e2 higher than 1 cm.

The touch function in this zone 160 cannot be executed by the capacitive touch device 10 due to the thickness e2. In fact, only a thickness e1 of the capacitive sensing medium 16 less than 1 cm, e.g. of 4 mm allows the capacitive touch device 10 to execute touch functions. In this embodiment, the touch function in the zone 160 is then executed based on the information from the optical system only.

In one preferred embodiment, this zone 160 is a scroll ball of a medical apparatus, e.g. an ultrasound apparatus.

In another embodiment, not illustrated, the zone 160 is not integrated in capacitive sensing medium 16. In this case, an object of a thickness e2 is placed over a flat capacitive sensing medium 16 of a capacitive touch device 10, and fixed to the capacitive sensing medium 16, e.g. by inserting it peripheral edge in holes or openings in the capacitive sensing medium 16.

Both for triggering and non-triggering objects, the system 1 according to the invention exploits the interaction between the capacitive touch device 10 and the optical system. According to a possible independent aspect of the invention, the information from the optical system is used to manage more than two objects touching the capacitive touch device 10. For example, if there are two or more fingers and/or (passive and/or active) pens touching the capacitive touch device 10, the optical system can identify them and detect and track their position. It can send this information to the processor. Then, the processor can activate different parts of the capacitive touch device 10 in correspondence of those fingers and/or pens and execute different and/or independent functions in each of those parts. In this embodiment, the system according to the invention allow to efficiently manage different (triggering and/or non-triggering) objects on the capacitive touch device 10.

According to another possible independent aspect of the invention, the information from the capacitive touch device 10, in particular the position information of an object on or over the capacitive touch device 10, can be used to calibrate the optical system.

Figure 8:
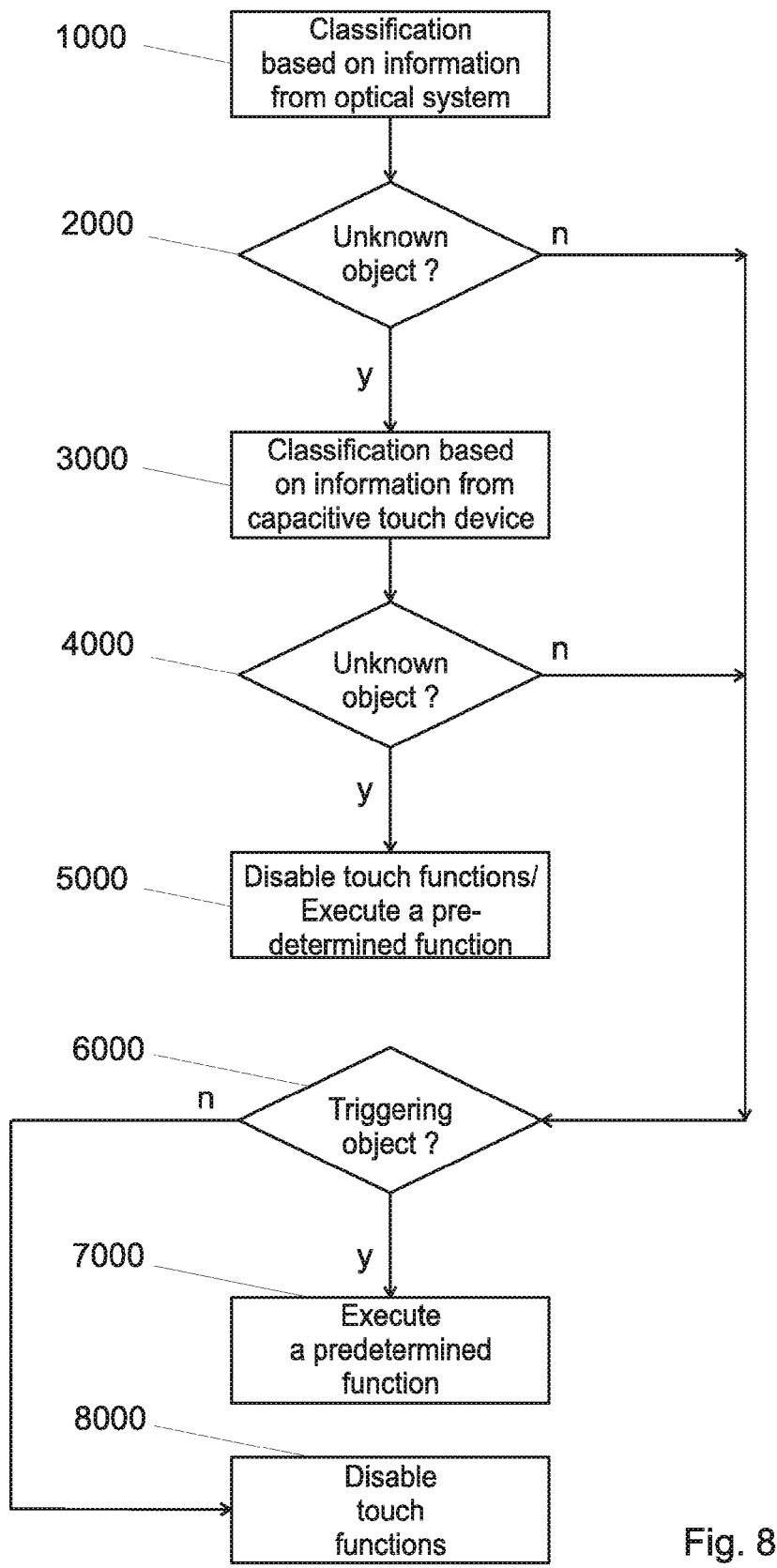
FIG. 8 shows a flow chart of some steps of an embodiment of the method according to the invention.

FIG. 8 shows a flow chart of some steps of an embodiment of the method according to the invention. In particular the step 1000 indicates the classification on an object 100 performed by the processor of the system, based on the information from the optical system only.

In one embodiment, the processor of the system classifies all objects 100 either as triggering object or as non-triggering object, based on the information as collected by the optical system.

Figure 9A:
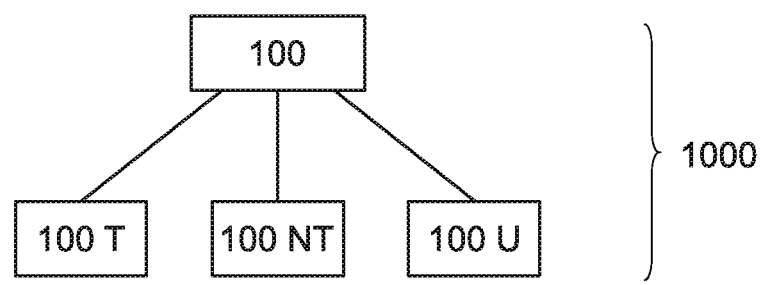
FIGS. 9A and 9B show a schematic view of the actions performed at some steps of the flow chart of FIG. 8.

In an alternative embodiment, objects that are not classified by the processor (based on the information as collected by the optical system only) as triggering objects or as non-triggering objects, are classified by the processor as "unknown objects". This embodiment is illustrated in FIG. 9A: during the step 1000, an object 100 can be classified—on the basis of the information from the optical system only—as triggering (100T), non-triggering (100NT) or unknown (100U). The three options are mutually exclusive, i.e. an object 100 cannot by classified at step 1000 as both triggering and non-triggering, for example. Moreover, an object 100 is classified as unknown object 100U, if and only if it is not classified as triggering or non-triggering.

At step 2000 of FIG. 8, the processor checks if the object 100 has been classified as an unknown object 100U at the previous step 1000.

If the object 100 has been classified as an unknown object 100U at the step 1000, then the processor of the system according to the invention classifies it at step 3000 based on the information on this object as collected by the capacitive touch device 10.

In one preferred embodiment, at step 3000 only information on this object as collected by the capacitive touch device 10 is used for the classification of the unknown object. In another embodiment, information on this object as collected by the capacitive touch device 10 is used in combination with information on this object previously collected by the optical system 20.

Figure 9B:
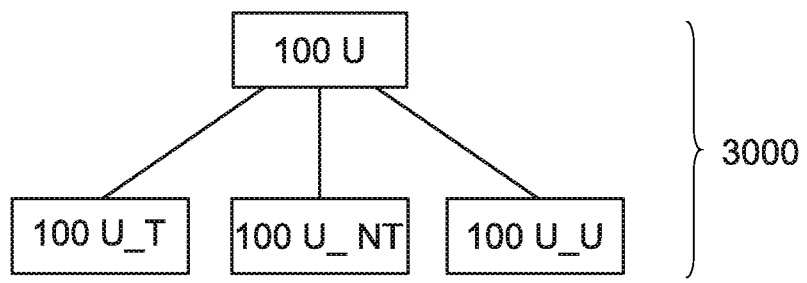

Step 3000 is detailed in FIG. 9B. During step 3000, an object 100U classified as unknown at step 1000 can be classified—on the basis of the information collected by the capacitive touch device (alone or in combination with information collected by the optical system)—as triggering (100U_T), non-triggering (100U_NT) or once again as unknown (100U_U). Again, the three options of FIG. 9B are mutually exclusive, i.e. an object 100U cannot by classified at step 3000 as both triggering and non-triggering, for example. Moreover, an object 100U is classified as unknown object 100U_U, if and only if it is not classified as triggering or non triggering at step 3000.

At step 4000 of FIG. 8, the processor checks if the unknown object 100U has been classified once again as an unknown object 100U_U at the previous step 3000.

If the unknown object 100U has been classified once again as an unknown object 100U_U at the step 3000, then the processor of the system according to the invention performs at the step 5000 one of the two following actions:

disable the execution of touch functions of the capacitive touch device, this disable being performed at least in the zone of contact between the capacitive touch device and the unknown object (as for the non-triggering object); or execute a predetermined function, e.g. a click function.

We revert now to step 2000. If the object 100 has not been classified as an unknown object 100U at the step 1000 (i.e. based on the information from the optical system only), then the step 6000 is performed. At step 6000, the processor of the system according to the invention checks if this object has been classified as triggering or non-triggering.

We revert now to step 4000. If an unknown object 100U has not been classified once again as an unknown object 100U_U at the step 3000 (i.e. based on the information from capacitive touch device), then the step 6000 is performed. At step 6000, the processor of the system according to the invention checks if this object has been classified as triggering or non-triggering.

In both cases, if the object has been classified as a triggering object (100T or 100U_T) at step 6000, then at step 7000 the processor is arranged so as to execute a predetermined function depending on the information collected on the object on the optical system and/or by the capacitive touch device.

If the object has been classified as a non-triggering object (100NT or 100U_NT) at step 6000, then at step 8000 the processor is arranged so to disable the execution of touch functions of the capacitive touch device, this disable being performed at least in the zone of contact between the capacitive touch device and the non-triggering object.

The present invention also concerns a method for detecting an object 100 approaching and touching a capacitive touch device 10 of a detection system, this detection system also comprising:

a processor, and an optical system connected to this processor and arranged to collect information on an object 100 near the capacitive touch device 10 and approaching the capacitive touch device 10, the method comprising the following steps:

classify the object 100 as a triggering object or as a non-triggering object based on this information from this optical system, if the object 100 is classified as a non-triggering object, disable the execution of touch functions of the capacitive touch device 10 at the latest when at least a part of the object touches the capacitive touch device 10, the disable being performed at least in the zone of contact 12 between the capacitive touch device 10 and the non-triggering object, if the object 100 is classified as a triggering object, at the latest when at least a part of the object touches the capacitive touch device 10, execute a predetermined function on this capacitive touch device depending on this information.

The present invention also concerns a computer program product for detecting an object 100 approaching and touching a capacitive touch device 10 of a detection system, this detection system also comprising:

a processor, and an optical system connected to this processor and arranged to collect information on an object near the capacitive touch device 10 and approaching the capacitive touch device 10, comprising:

a tangible computer usable medium including computer usable program code being used for classifying the object 100 as a triggering object or as a non-triggering object based on this information from this optical system, if the object 100 is classified as a non-triggering object, disable the execution of touch functions of the capacitive touch device 10 at the latest when at least a part of the object touches the capacitive touch device 10, this disable being performed at least in the zone of contact 12 between the capacitive touch device and the non-triggering object, if the object 100 is classified as a triggering object, at the latest when at least a part of the object touches the capacitive touch device 10, execute a predetermined function on this capacitive touch device 10 depending on this information.

According to one embodiment, this method comprises also the following steps:

classify an object as unknown object 100U, if it is not classified as triggering nor as non-triggering based on the information from the optical system, classify the unknown object 100U as a triggering object 100U_T or as a non-triggering object 100U_NT based on information from the capacitive touch device 10, if the object is classified as a non-triggering object 100U_NT, disable the execution of touch functions of the capacitive touch device 10, the disable being performed at least in the zone of contact between the capacitive touch device 10 and the non-triggering object 100U_NT, if the object is classified as a triggering object 100U_T, execute a predetermined function on this capacitive touch device 10 depending on this information.

According to one embodiment, this method comprises also the following steps:

classify the unknown object once again as unknown object 100U_U, based on the information as collected by the capacitive touch device, if it is not classified by the processor as triggering nor as non-triggering based on the information from the capacitive touch device 10, after this classify, perform one of the two following steps:
disable the execution of touch functions of the capacitive touch device, the disable being performed at least in the zone of contact between the capacitive touch device 10 and the unknown object 100U_U,
execute a predetermined function on this capacitive touch device 10, e.g. a click function.

REFERENCE NUMBERS AND SIGNS USED IN THE FIGURES

1 Detection system
10 Capacitive touch device
12 Contact zone between an object and the capacitive touch device
14 Reserved zone of the capacitive touch device
16 Capacitive sensing medium of the capacitive touch device
18 Touch controller
20 Element of the optical system
100 Object
100T Triggering object
100NT Non-triggering object
100U Unknown object
100U_T Triggering object
100U_NT Non-triggering object
100U_U Unknown object
102 Rotating button
104 Push button
106 Elastic element
160 Zone of thickness e2
1000 Classification step based on information from the optical system only
2000 Checking step, if the object is an unknown object
3000 Classification step based on information from the capacitive touch device
4000 Checking step, if the object is again an unknown object
5000 Disabling of the execution of touch functions step; or executing of a predetermined function step (e.g. click function)
6000 Checking step, if the object is a triggering or non-triggering object
7000 Executing of a predetermined function step
8000 Disabling of the execution of touch functions step
3DT, MT Projected touch regions
3DCM Center of gravity of the projected touch region
3DT
A, B, C Arrows
CM Center of gravity of the touch region T
CV Center of volume of the object
MCM Center of gravity of the projected touch region MT
P Main axis of the object
T Effective touch region
Volume
h Height
l Length
e1, e2 Thickness

The invention claimed is:

1. A system for detecting an object approaching and touching a capacitive touch device, said system comprising
said capacitive touch device,
a processor,
an optical system connected to said processor and arranged to collect information on said object,
said processor being arranged so as to execute the following functions:
classify the object as a triggering object or as a non-triggering object based on said information from said optical system,
if the object is classified as a non-triggering object, disable the execution of touch functions of the capacitive touch device at the latest when at least a part of the object touches the capacitive touch device, said disable being performed at least in the zone of contact between the capacitive touch device and the non-triggering object,
if the object is classified as a triggering object, at the latest when at least a part of the object touches the capacitive touch device, execute a predetermined function on said capacitive touch device depending on said information.

2. The system of claim 1, wherein
said capacitive touch device is connected to said processor and arranged to collect information on said object, and wherein
said processor is arranged so as to:
classify the object as unknown object, if said object has not be classified as a triggering object nor as a non-triggering object based on the information from said optical system,
classify the unknown object as a triggering object or as a non-triggering object, based on the information on said object from the capacitive touch device.

3. The system of claim 2, wherein said processor is arranged so as to:
classify the unknown object once again as unknown object, if said unknown object has not be classified as a triggering object nor as a non-triggering object based on the information from the capacitive touch device.

4. The system of claim 1, wherein the processor is configured, if the object is classified as a non-triggering object, to enable or keep enabled the execution of the touch function of the capacitive touch device in another zone of the capacitive touch device at least for a part of the time, when the execution of touch functions of the capacitive touch device remains disabled at least in the zone of contact.

5. The system of claim 1, wherein said processor is configured, if the object is classified as a triggering object, to execute on said capacitive touch device the predetermined function when the touch of at least a part of the object on the capacitive touch device is detected in the capacitive touch device.

6. The system of claim 1, wherein said processor is configured to compute a projection of the object on the capacitive touch device along a predetermined direction, based on the information collected from the optical system, said projection defining a projected touch region.

7. The system of claim 6, wherein said processor is arranged to calibrate the optical system and/or the capacitive touch device based on said projected touch region.

8. The system of claim 1, wherein the predetermined function is a function associated with the detected triggering object.

9. The system of claim 8, wherein the triggering object is a mechanical user input device, wherein the processor is configured to execute the predetermined function, when the activation of the mechanical user input device is detected on the capacitive touch device and/or by the optical system.

10. The system of claim 1, wherein said triggering object is a rotating button, wherein said predetermined function depends on the rotation of the rotating button as captured by the optical system and/or by the capacitive touch device.

11. The system of claim 1, wherein said triggering object is a push button comprising an elastic or movable element wherein once the push button is pushed, the elastic or movable element enters into contact with the capacitive touch device so as to execute a push button function.

12. The system of claim 1, wherein said non-triggering object is a liquid, as a beverage or an industrial or professional liquid, e.g. oil, or human liquid, e.g. blood, or wherein said non-triggering object is a medical liquid or a medical jelly like, e.g. a medical gel used during an echography.

13. The system of claim 1, the capacitive touch device comprising a zone having a thickness higher than 1 cm, wherein the touch function in said zone is executed based only on the information from the optical system.

14. The system of claim 1, the processor being arranged to treat multiple objects at the same time, at one of said objects being a triggering object and at least one of said objects being a non-triggering object.

15. A method for detecting an object approaching and touching a capacitive touch device of a detection system, said detection system comprising also:
a processor, and
an optical system connected to said processor and arranged to collect information on said object,
said method comprising the following steps:
classify the object as a triggering object or as a non-triggering object based on said information from said optical system,
if the object is classified as a non-triggering object, disable the execution of touch functions of the capacitive touch device at the latest when at least a part of the object touches the capacitive touch device, said disable being performed at least in the zone of contact between the capacitive touch device and the non-triggering object,
if the object is classified as a triggering object, at the latest when at least a part of the object touches the capacitive touch device, execute a predetermined function on said capacitive touch device depending on said information.

16. A non-transitory computer readable storage medium stored in a non-transitory memory for detecting an object approaching and touching a capacitive touch device of a detection system, said detection system comprising also:
a processor, and
an optical system connected to said processor and arranged to collect information on said object,
said computer readable storage medium comprising:
a tangible computer usable medium including computer usable program code being used for
classifying the object as a triggering object or as a non-triggering object based on said information from said optical system,
if the object is classified as a non-triggering object, disable the execution of touch functions of the capacitive touch device at the latest when at least a part of the object touches the capacitive touch device, said disable being performed at least in the zone of contact between the capacitive touch device and the non-triggering object,
if the object is classified as a triggering object, at the latest when at least a part of the object touches the capacitive touch device, execute a predetermined function on said capacitive touch device depending on said information.

* * * * *